(12) United States Patent
Xia et al.

(10) Patent No.: US 11,916,588 B2
(45) Date of Patent: Feb. 27, 2024

(54) SYSTEMS AND METHODS FOR SENSING FIBER OPTIC CABLES OF ACCESS NETWORKS

(71) Applicant: Verizon Patent and Licensing Inc., Basking Ridge, NJ (US)

(72) Inventors: Tiejun J. Xia, Richardson, TX (US); Glenn A. Wellbrock, Wylie, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 229 days.

(21) Appl. No.: 17/222,157

(22) Filed: Apr. 5, 2021

(65) Prior Publication Data

US 2022/0321211 A1   Oct. 6, 2022

(51) Int. Cl.
*H04B 10/07* (2013.01)
*H04B 10/071* (2013.01)
*H04B 10/61* (2013.01)
*H04B 10/035* (2013.01)

(52) U.S. Cl.
CPC ......... *H04B 10/071* (2013.01); *H04B 10/035* (2013.01); *H04B 10/614* (2013.01)

(58) Field of Classification Search
CPC ... H04B 10/071; H04B 10/035; H04B 10/614
USPC .................................................. 356/73.1, 73
See application file for complete search history.

(56) References Cited

U.S. PATENT DOCUMENTS

| 2011/0013904 A1* | 1/2011 | Khermosh | H04B 10/071 398/16 |
| 2014/0126900 A1* | 5/2014 | Urban | H04B 10/0771 398/13 |

FOREIGN PATENT DOCUMENTS

| JP | 2012-533732 | * 12/2012 | G01M 11/00 |
| WO | WO-2014005259 A1 | * 1/2014 | H04B 10/071 |
| WO | WO-2018202778 A1 | * 11/2018 | H04B 10/071 |

* cited by examiner

*Primary Examiner* — Mohammad R Sedighian (57) ABSTRACT

In some implementations, a device may transmit communication data to a transceiver via an access fiber optic cable. The device may determine that fiber sensing is to be performed for the access fiber optic cable. The device may cease transmission of the communication data for a predetermined time period. The device may generate an optical pulse after ceasing transmission of the communication data. The device may transmit the optical pulse to the transceiver via the access fiber optic cable. The device may receive, prior to expiration of the predetermined time period, a reflected signal from the access fiber optic cable based on the optical pulse. The device may analyze the reflected signal to generate sensing results. The device may perform one or more actions based on the sensing results.

20 Claims, 10 Drawing Sheets

SYSTEMS AND METHODS FOR SENSING FIBER OPTIC CABLES OF ACCESS NETWORKS

BACKGROUND

An optical network relies on optical signals to exchange information between network devices of a network, such as a telecommunications network. Information is encoded as pulses of light and carried to different network devices using combinations of lasers or light emitting diodes (LEDs), optical amplifiers, repeaters, and other supporting network devices. The network devices of an optical network are generally comprised of optical transmitters and/or optical receivers which exchange optical signals via interconnected arrays of optical fibers. An optical communication link is formed when an optical fiber is connected to an optical transmitter and an optical receiver and is capable of transmitting an optical signal from the optical transmitter to the optical receiver.

DETAILED DESCRIPTION OF PREFERRED EMBODIMENTS

The following detailed description of example implementations refers to the accompanying drawings. The same reference numbers in different drawings may identify the same or similar elements.

The combination of deployed fiber optic network infrastructure and fiber optic sensing technology offers a host of applications that may benefit both telecommunications service providers and their customers. Current techniques for fiber optic cable sensing are performed on a dedicated dark fiber optic cable (e.g., a fiber optic cable not used for data transmission) or on a service fiber optic cable with wavelength sharing technology. Both the dedicated dark fiber optic cable and the service fiber optical cable techniques may be suitable for testing backbone fiber optic cables, such as fiber optic cables provided between central offices. However, the dedicated dark fiber optic cable and the service fiber optical cable techniques may not be suitable for testing access fiber optic cables (e.g., a fiber optic cable connecting a transceiver, an endpoint device, and/or a splitter to a backbone fiber optic cable) due to a distribution configuration of the access fiber optic cables and a quantity of the access fiber optic cables.

For example, installing a dedicated dark fiber optic cable in each access fiber optic cable for fiber sensing and/or installing a wavelength sharing device at each access endpoint device (e.g., a customer endpoint device) associated with each access fiber optic cable may be cost prohibitive. Further, a quantity of optical fibers included in an access fiber optic cable may be less than a quantity of optical fibers included in a backbone fiber optic cable, which may make it more difficult to include a dedicated dark fiber optic cable in an access fiber optic cable relative to including a dedicated dark fiber optic cable in a backbone fiber optic cable.

Thus, a service provider may be unable to monitor and/or determine a status (e.g., operational, damaged, destroyed, experiencing vibrations, and/or the like) of an access fiber optic cable. Because the service provider is unable to monitor and/or determine the status of an access fiber optic cable, one or more access endpoint devices may consume computing resources (e.g., processor resources, memory resources, communication resources, networking resources, and/or the like) attempting to re-establish connectivity due to a faulty access fiber optic cable, restoring sessions due to a faulty access fiber optic cable, and/or the like. Additionally, the service provider may consume computing resources communicating with one or more customers regarding disrupted services for the endpoint devices, investigating sources of the disrupted services, and/or the like.

Some implementations described herein relate to a sensing transceiver that senses fiber optic cables of access networks. For example, the sensing transceiver may transmit communication data to a transceiver via an access fiber optic cable. The sensing transceiver may determine that fiber sensing is to be performed for the access fiber optic cable. The sensing transceiver may cease transmission of the communication data for a predetermined period based on determining that fiber sensing is to be performed for the access fiber optic cable. The sensing transceiver may generate an optical pulse after ceasing transmission of the communication data. The sensing transceiver may transmit the optical pulse to the transceiver via the access fiber optic cable and may receive a reflected signal from the access fiber optic cable based on transmitting the optical pulse. The sensing transceiver may generate sensing results based on analyzing the reflected signal. The sensing transceiver may perform one or more actions based on the sensing results. For example, the sensing transceiver may determine whether the access fiber optic cable is operational, damaged, destroyed, experiencing vibrations, and/or the like based on the sensing results.

In this way, the sensing transceiver senses and/or determines a status (e.g., operational, damaged, destroyed, experiencing vibrations, and/or the like) of fiber optic cables of access networks. By sensing and/or determining a status of fiber optic cables of access networks, the sensing transceiver may conserve resources that might otherwise have been consumed due to disrupted services. For example, the sensing transceiver may conserve resources that might otherwise have been consumed by access endpoint devices attempting to re-establish connectivity due to a faulty access fiber optic cable, restoring sessions due to a faulty access fiber optic cable, and/or the like. Additionally, the sensing transceiver may conserve computing resources that might otherwise have been consumed by the service provider communicating with one or more customers regarding disrupted services, investigating a source of the disrupted services, and/or the like.

FIGS. 1A-1G are diagrams of an example 100 associated with sensing fiber optic cables of access networks. As shown in FIGS. 1A-1G, example 100 includes a plurality of network devices that are interconnected by one or more fiber optic cables to form an optical network. A fiber optic cable may include an array of optical fibers configured to transmit an optical signal via the optical network. The network devices can include any one or more of optical transmitters, optical receivers, optical transceivers (e.g., a network device including an optical transmitter and an optical receiver), optical sources, amplifiers, repeaters, switches, multiplexers, splitters, circulators, or any other device suited to transmit and/or receive an optical signal. Optical signals can be provided using lasers, light emitting diodes (LEDs), and/or any other polarized light suitable for transmitting information over an optical network. The optical fibers can include glass fibers, glass-polymer fibers, polymer fibers, or any other medium suitable for transmitting optical signals.

In the example 100, the network devices are shown as sensing transceivers 102, endpoint devices 104, and transceivers 106 communicatively coupled to a central office via an access fiber optic cable and/or a backbone fiber optic cable included in the optical network. A sensing transceiver 102 and/or a transceiver 106 may include an optical transmitter and an optical receiver. The optical transmitter may be configured to transmit an optical signal through at least one optical fiber across the optical network to a designated optical receiver. The optical receiver may be configured to receive an optical signal transmitted by an optical transmitter via at least one optical fiber. Although one possible arrangement is shown, the example 100 can be provided in other arrangements. For example, additional or fewer sensing transceivers 102, additional or fewer endpoint devices 104, and/or additional or fewer transceivers 106 may be used to transmit optical signals across the optical network and/or one or more additional optical networks.

Figure 1A:
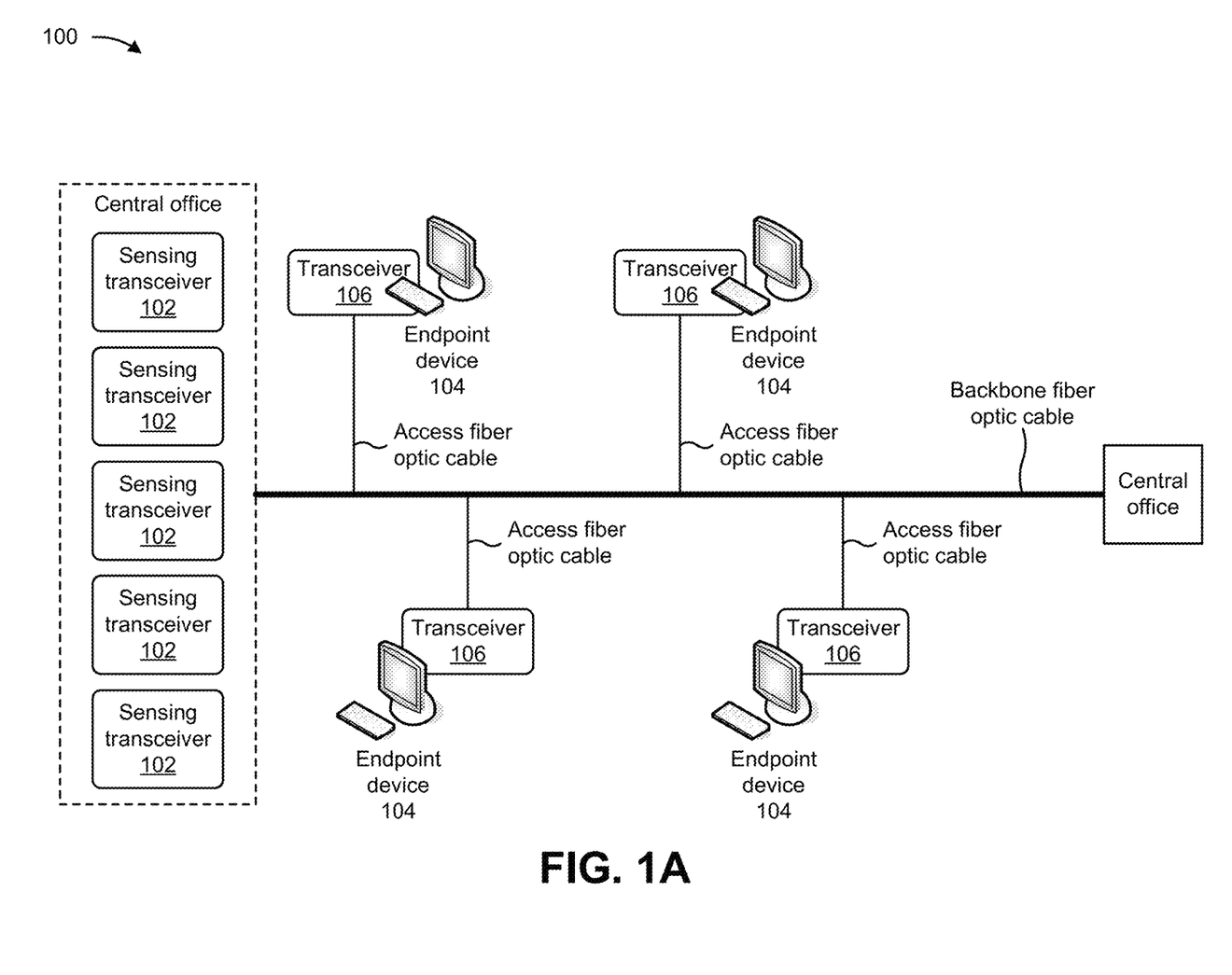
FIGS. 1A-1G are diagrams of an example associated with sensing fiber optic cables of access networks.
Figure 1B:
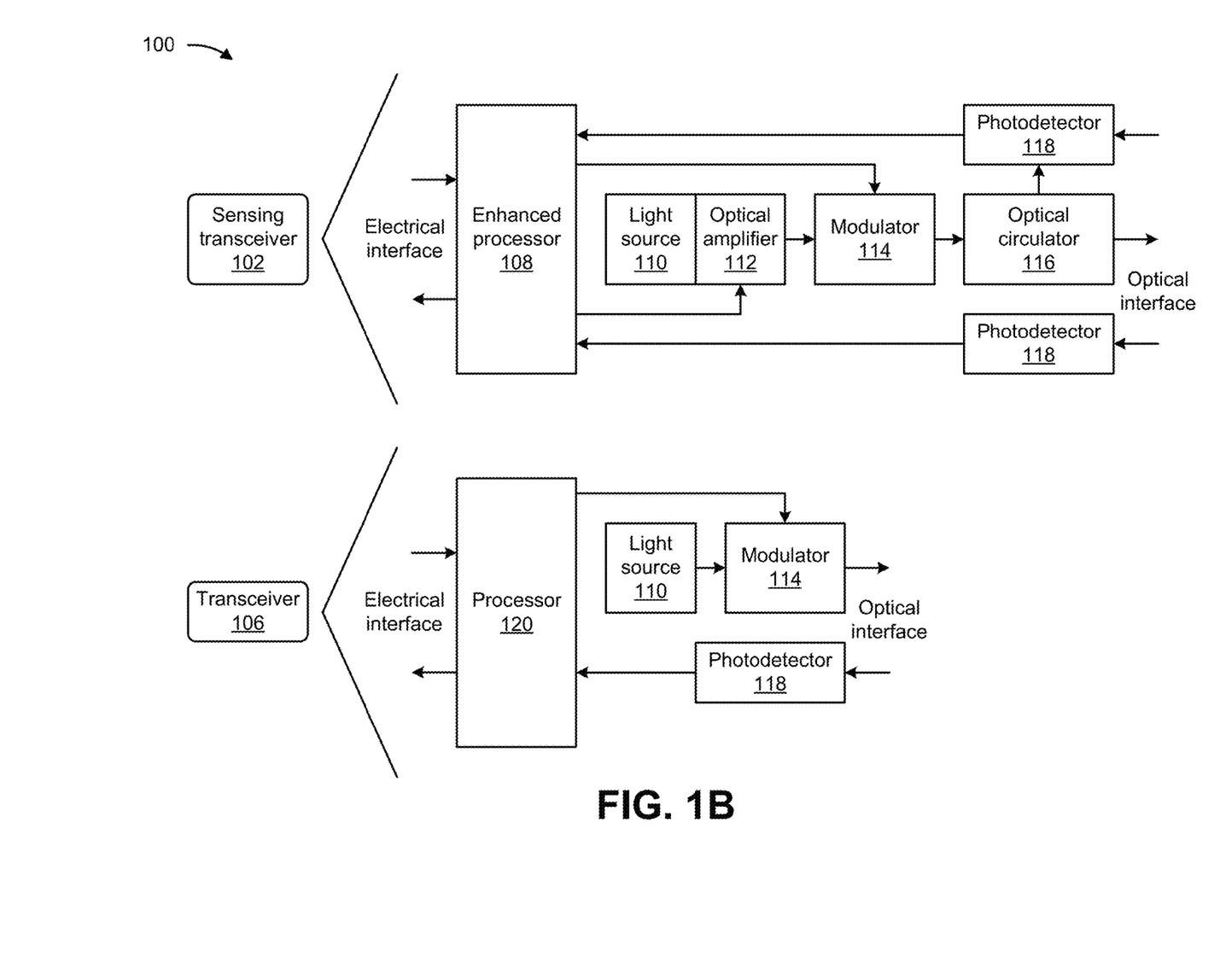

As shown in FIG. 1B, a sensing transceiver 102 may include an enhanced processor 108, a light source 110, an optical amplifier 112, a modulator 114, an optical circulator 116, and a plurality of photodetectors 118. The enhanced processor 108 may include a communication data processor, a pulse generator, and a fiber optic sensing data processor.

The communication data processor may be configured to control one or more processes associated with the sensing transceiver 102 transmitting and/or receiving data communications via an optical fiber. The communication data processor may include any one or more of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the communication data processor may include one or more processors capable of being programmed to perform a function. The communication data processor may further include or otherwise have access to a memory in the form of random access memory (RAM), read only memory (ROM), and/or another type of dynamic or static storage device (e.g., a flash memory, a magnetic memory, and/or an optical memory) that stores information and/or instructions for use by the communication data processor.

The pulse generator may include one or more devices configured to generate a pulse of light through an optical fiber. For example, the pulse generator may be configured to cause a light source (e.g., the light source 110, an internal light source of the pulse generator, and/or another light source) to generate a pulse of light through an optical fiber of a fiber optic cable (e.g., an access fiber optic cable, a backbone fiber optic cable, and/or the like). The pulse generator may allow control of (e.g., by the fiber optic sensing data processor) one or more characteristics of the generated pulse, such as a pulse repetition rate (e.g., a frequency), a width of the pulse, an amplitude of the pulse, a delay with respect to an internal or external trigger, and/or the like.

The fiber optic sensing data processor may be configured to control one or more processes associated with the sensing transceiver 102 sensing an access fiber optic cable and/or determining a status (e.g., operational, damaged, destroyed, degraded, experiencing vibrations, and/or the like) of the access fiber optic cable, as described herein. The fiber optic sensing data processor may include any one or more of a CPU, a GPU, an APU, a microprocessor, a microcontroller, a DSP, a FPGA, an ASIC, or another type of processing component. In some implementations, the fiber optic sensing data processor may include one or more processors capable of being programmed to perform a function. The fiber optic sensing data processor may further include or otherwise have access to a memory in the form of RAM, ROM, and/or another type of dynamic or static storage device (e.g., a flash memory, a magnetic memory, and/or an optical memory) that stores information and/or instructions for use by the fiber optic sensing data processor.

The light source 110 may include one or more devices configured to transmit photon (or light) energy through an optical fiber. For example, the light source 110 may include a laser, an LED, a semiconductor laser diode, and/or any other polarized light suitable for transmitting information over an optical network.

The optical amplifier 112 may include one or more devices configured to receive an optical signal and/or to amplify the optical signal directly (e.g., without first converting the optical signal into an electrical signal). The optical amplifier 112 may include an Erbium-doped fiber amplifier (EDFA), a fiber Raman amplifier (FRA), and/or the like.

The modulator 114 may include one or more devices configured to control the power (e.g., intensity), the optical phase, and/or the polarization of an optical signal. For example, the modulator 114 may include an electro-optic modulator that uses an electrical control signal to control the power, the optical phase, and/or the polarization of a light emitted by the light source 110.

The optical circulator 116 may include one or more devices configured to separate optical signals traveling in opposite directions. The optical circulator 116 may include a series of ports (e.g., 3 or 4 ports) configured to cause an optical signal entering a first port to be emitted from a next port in the series of ports.

A photodetector 118, of the plurality of photodetectors 118, may include a sensor capable of detecting changes in intensity in an optical signal (e.g., capable of converting photons to electrical current). The photodetector 118 may be coupled to a polarizer and configured to detect changes in intensity in a portion of an optical signal.

As also shown in FIG. 1B, a transceiver 106 may include a processor 120, a light source 110, a modulator 114, and a photodetector 118. The processor 120 may include a communications data processor. In some implementations, the communications data processor is similar to the communications data processor described above with respect to the enhanced processor 108. Similarly, the light source 110, the modulator 114, and the photodetector 118 may include a light source 110, a modulator 114, and a photodetector 118 similar to the light source 110, the modulator 114, and the photo detector 118 described above.

Figure 1C:
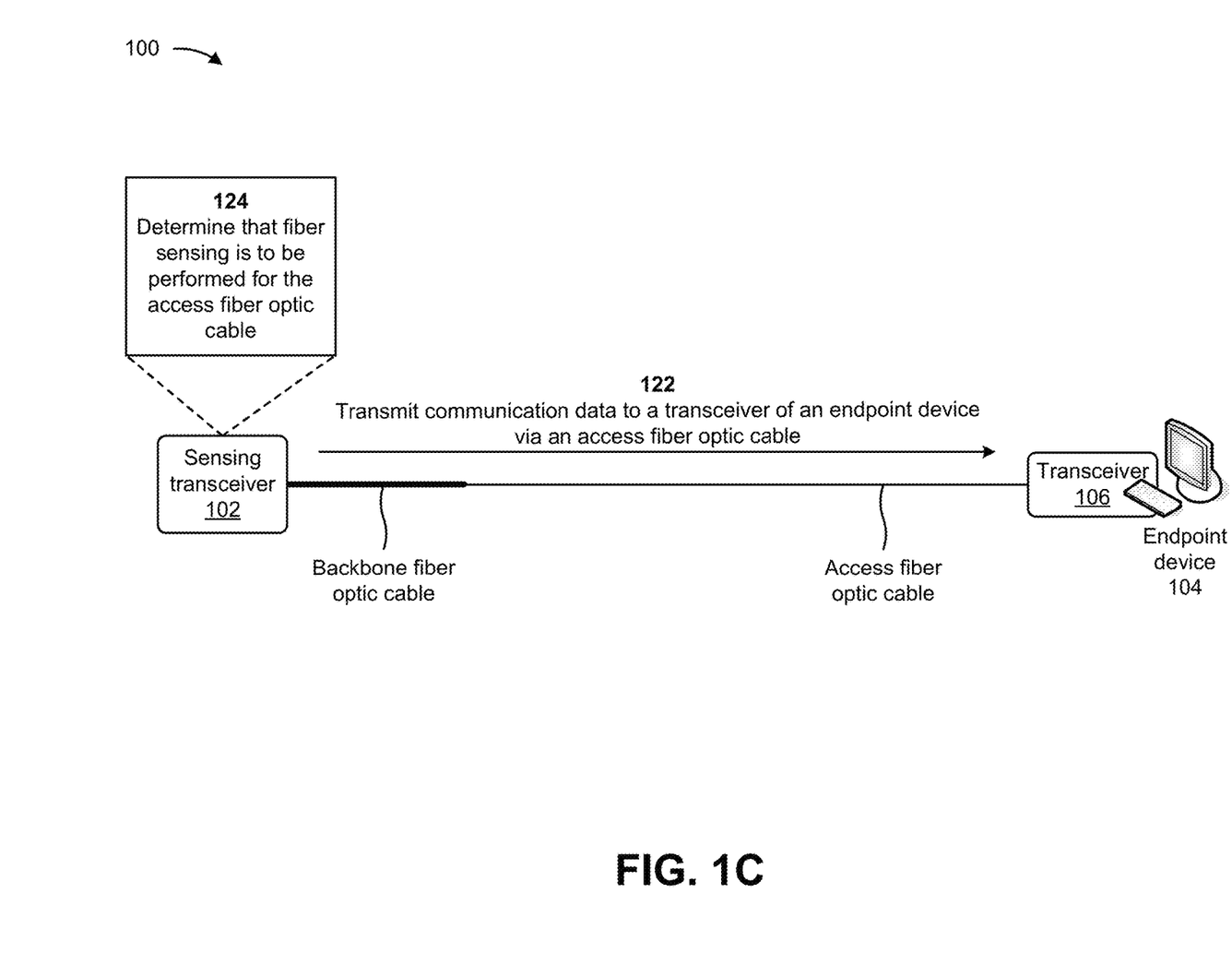

As shown in FIG. 1C, and by reference number 122, the sensing transceiver 102 transmits communication data to a transceiver 106 of an endpoint device 104 via an access fiber optic cable. For example, the sensing transceiver 102 may operate in a first communication mode associated with transmitting communication data to one or more transceivers 106 via one or more access fiber optic cables. The sensing transceiver 102 may receive communications data to be transmitted to the endpoint device 104 via the transceiver 106. The sensing transceiver 102 may transmit the communication data to the transceiver 102 based on the sensing transceiver operating in the first communication mode.

In some implementations, the sensing transceiver 102 transmits the communication data to the access fiber optic cable via a backbone fiber optic cable. For example, the sensing transceiver 102 may be connected to a backbone fiber optic cable. A first end of the access fiber optic cable may connect to the backbone fiber optic cable and a second end of the access fiber optic cable may connect directly to the transceiver 106. Alternatively, and/or additionally, the second end of the access fiber optic cable may be connected to a splitter that directly connects to the transceiver 106. In some implementations, the transceiver 106 is provided within an endpoint device 104 that is connected to the access fiber optic cable and/or the splitter.

As shown by reference number 124, the sensing transceiver 102 determines that fiber sensing is to be performed for the access fiber optic cable. In some implementations, the sensing transceiver 102 determines that the fiber sensing is to be performed for the access fiber optic cable based on an expiration of a time period. For example, the sensing transceiver 102 may periodically (e.g., every minute, every ten minutes, every day, and/or the like) perform fiber sensing for the access fiber optic cable. Alternatively, and/or additionally, the sensing transceiver 102 may determine that the fiber sensing is to be performed by the access fiber optic cable based on information (e.g., a data structure storing information indicating a schedule of times and/or access fiber optic cables for which fiber sensing is to be performed) stored in a memory associated with the sensing transceiver 102, a message received from another device (e.g., a message received from a network device indicating that fiber sensing is to be performed for the access fiber optic cable), and/or the like.

In some implementations, the sensing transceiver 102 determines that the fiber sensing is to be performed for the access fiber optic cable based on transmitting the communication data to the transceiver 106. For example, the sensing transceiver 102 may determine that a response to the communication data is not received within a time period. The sensing transceiver 102 may determine that the fiber sensing is to be performed for the access fiber optic cable based on the response to the communication data not being received within the time period.

Figure 1D:
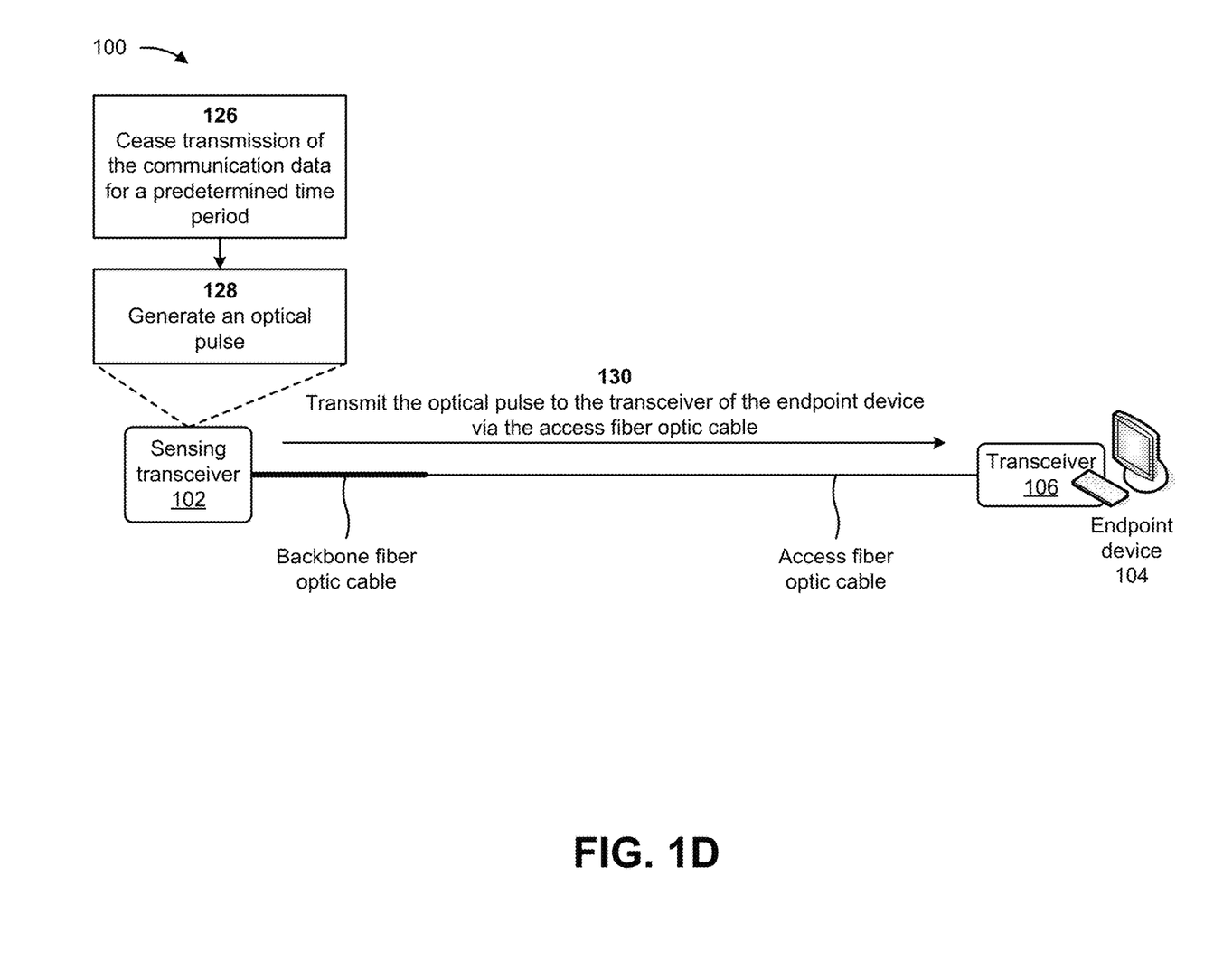

As shown in FIG. 1D, and by reference number 126, the sensing transceiver 102 ceases transmission of the communication data for a predetermined time period. The predetermined time period may be determined based on an asynchronous transmission protocol associated with the transceiver 106 and/or the endpoint device 104. For example, the transceiver 106 and/or the endpoint device may be associated with an access network that utilizes an Ethernet protocol. The Ethernet protocol may allow a communication data flow to be interrupted for a period of time (e.g., 100 ms, 200 ms, 300 ms, and/or the like) without a network layer triggering a process to determine an alternate route for the communication data flow. The sensing transceiver 102 may cease transmission of the communication data for a predetermined time period that is less than the period of time for which the Ethernet protocol allows a communication data flow to be interrupted without the network layer triggering the process to determine an alternate route for a communication data flow associated with the communication data.

As shown by reference number 128, the sensing transceiver 102 generates an optical pulse. For example, the enhanced processor 108 may cause the sensing transceiver 102 to transition from the first communication mode to a second communication mode based on the sensing transceiver 102 ceasing communication of the communication data. The second communication mode may be associated with the sensing transceiver 102 performing fiber sensing for an access optical fiber cable. The fiber optic sensing data processor may cause the pulse generator to generate an optical pulse based on the sensing transceiver 102 transitioning to the second communication mode and/or based on the sensing transceiver 102 ceasing transmission of the communication data.

In some implementations, the sensing transceiver 102 (e.g., the pulse generator) causes the light source 110 to emit the optical pulse. For example, the pulse generator may transmit a signal to the light source 110 to cause the light source to emit the optical pulse. In some implementations, the light source 110 provides the optical pulse to the optical amplifier 112 to amplify the optical pulse. For example, the sensing transceiver 102 may determine that a length of the access fiber optic cable satisfies one or more criteria (e.g., is greater than a threshold length) and may cause the light source 110 to provide the optical pulse to the optical amplifier 112 based on the length of the access fiber optic cable satisfying the one or more criteria.

As shown by reference number 130, the sensing transceiver 102 transmits the optical pulse to the transceiver 106 of the endpoint device 104 via the access fiber optic cable. For example, the sensing transceiver 102 may transmit the optical pulse to the transceiver 106 via the modulator 114, the optical circulator 116, and/or an optical interface communicatively coupled to the optical circulator 116.

Figure 1E:
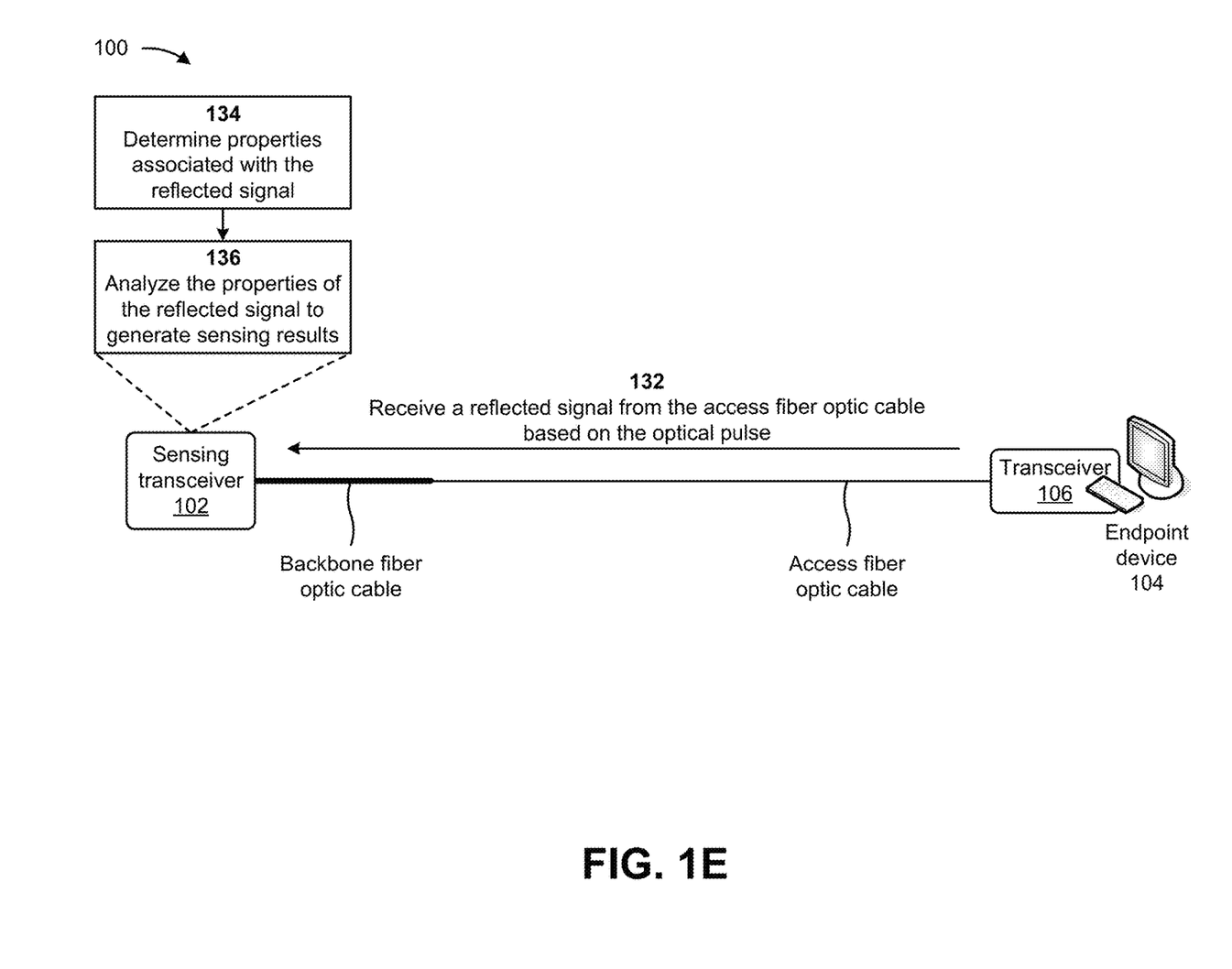

As shown in FIG. 1E, and by reference number 132, the sensing transceiver 102 receives a reflected signal from the access fiber optic cable based on the optical pulse. For example, the reflected signal may be received from the access fiber optic cable via a photodetector 118 of the sensing transceiver 102 based on the sensing transceiver 102 transmitting the optical pulse to the transceiver 106.

As shown by reference number 134, the sensing transceiver 102 determines properties associated with the reflected signal. For example, the sensing transceiver 102 may determine an amplitude, a phase, a frequency, a wavelength, and/or the like associated with the reflected signal. In some implementations, an amount of time required to transmit the optical pulse to the transceiver 106 and receive the reflected signal is less than an amount of time for which an asynchronous protocol associated with the transceiver 106 and/or the endpoint device 104 allows a communication data flow to be interrupted prior to executing a process for determining an alternate route for a communication data flow.

For example, the asynchronous protocol may allow a communication data flow to be interrupted for a period of 300 ms prior to executing a process for determining an alternate route for a communication data flow associated with the communication data. The amount of time required to transmit the optical pulse to the transceiver 106 and to receive the reflected signal may be less than 300 ms (e.g., 0.2 ms for an access fiber optical cable having a length of 20 meters).

As shown by reference number 136, the sensing transceiver 102 analyzes the properties of the reflected signal to generate sensing results. The sensing results may include information indicating a status of the access fiber optic cable. For example, the sensing results may include information indicating that the access fiber optic cable is operational, damaged, destroyed, experiencing vibrations, and/or the like.

In some implementations, the sensing transceiver 102 analyzes the properties of the reflected signal based on properties associated with different statuses of the access fiber optic cable. For example, the sensing transceiver 102 may determine whether a wavelength of the reflected signal satisfies one or more wavelength criteria (e.g., whether the wavelength is within a first range of wavelengths associated with a first status, a second range of wavelengths associated with a second status, and/or the like), whether an amplitude of the reflected signal satisfies one or more amplitude criteria, whether a phase of the reflected signal satisfies one or more phase criteria, and/or the like. The sensing data may include information indicating whether the wavelength of the reflected signal satisfies the one or more wavelength criteria, whether the amplitude of the reflected signal satisfies the one or more amplitude criteria, whether the phase of the reflected signal satisfies the one or more phase criteria, and/or the like.

Figure 1F:
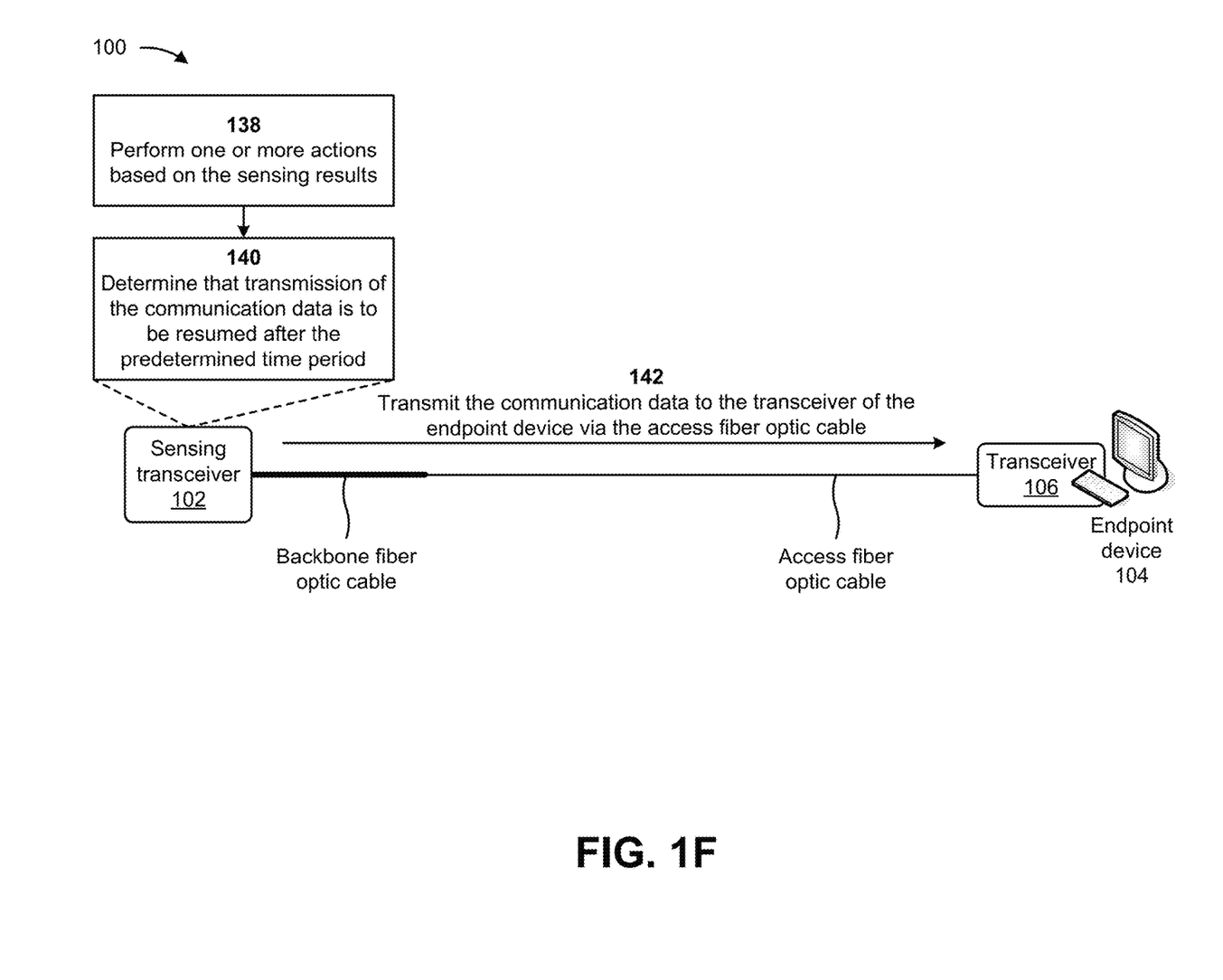

As shown in FIG. 1F, and by reference number 138, the sensing transceiver 102 performs one or more actions based on the sensing results. In some implementations, the one or more actions include the sensing transceiver 102 providing the sensing results and/or the properties of the reflected signal to another device. For example, the sensing transceiver 102 may provide the sensing results and/or the properties of the reflected signal to a device included in a cloud computing environment, another network device, and/or the like to cause the sensing results and/or the properties of the reflected signal to be stored in a data structure (e.g., a database, a table, a list, and/or the like) and/or to be further processed by one or more other devices.

In some implementations, the one or more actions include the sensing transceiver 102 determining, based on the sensing results, whether the access fiber optic cable is operational, whether the access fiber optic cable is damaged, whether the access fiber optic cable is destroyed, and/or whether the access fiber optic cable is experiencing vibrations. In some implementations, the sensing transceiver 102 performs one or more additional actions based on determining whether the access fiber optic cable is operational, damaged, destroyed, and/or experiencing vibrations. For example, the sensing transceiver 102 may cause information indicating that the access fiber optic cable is operational, damaged, destroyed, and/or experiencing vibrations to be transmitted to a user device associated with a user (e.g., a network operator), may cause one or more properties of an optical signal transmitted by the sensing transceiver 102 to be modified, may transmit communication data to the transceiver 106 via an alternate communications link, and/or the like.

As shown by reference number 138, the sensing transceiver 102 determines that transmission of the communication data is to be resumed after the predetermined time period. The sensing transceiver 102 may determine that the transmission of the communication data is to be resumed based on an expiration of the predetermined time period, based on generating the sensing results, and/or based on providing the sensing results and/or the properties of the reflected signal to another device. As shown by reference number 140, the sensing transceiver 102 transmits the communication data to the transceiver 106 of the endpoint device 104 via the access fiber optic cable based on determining that the transmission of the communication data is to be resumed.

Figure 1G:
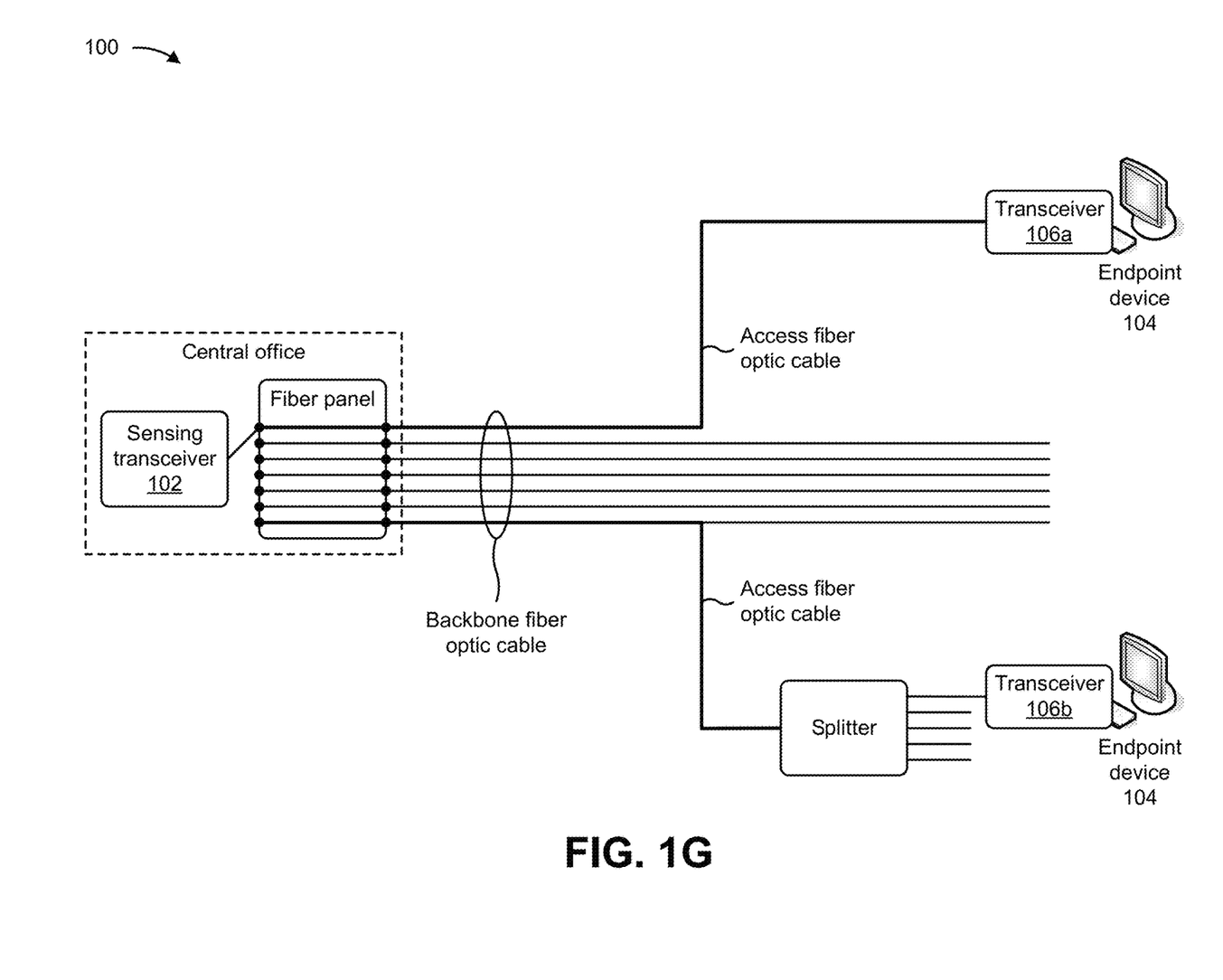

As shown in FIG. 1G, and by reference number 142, the sensing transceiver 102 is associated with a fiber panel. The fiber panel may be configured to enable the sensing transceiver 102 to transmit optical signals to a plurality of transceivers 106 via a plurality of optic fibers included in a backbone fiber optic cable and/or an access fiber optic cable. As shown in FIG. 1G, the fiber panel may enable the sensing transceiver 102 to transmit an optical signal via an access fiber optic cable connected directly to the transceiver 106a. Because the access fiber optic cable is connected directly to the transceiver 106a, the sensing transceiver 102 may perform end-to-end fiber sensing (e.g., from the sensing transceiver 102 to the transceiver 106a).

As also shown in FIG. 1G, the fiber panel may enable the sensing transceiver 102 to transmit an optical signal via an access fiber optic cable connected to a splitter that is connected to the transceiver 106b. Because the access fiber optic cable is connected to the splitter, the sensing transceiver 102 may perform end-to-splitter fiber sensing (e.g., from the sensing transceiver 102 to the splitter).

As described above, the sensing transceiver senses and/or determines a status (e.g., operational, damaged, destroyed, experiencing vibrations, and/or the like) of fiber optic cables of access networks. By sensing and/or determining a status of fiber optic cables of access networks, the sensing transceiver may conserve resources that might otherwise have been consumed due to disrupted services. For example, the sensing transceiver may conserve resources that might otherwise have been consumed by the access endpoint devices attempting to re-establish connectivity due to a faulty access fiber optic cable, restoring sessions due to a faulty access fiber optic cable, and/or the like. Additionally, the sensing transceiver may conserve computing resources that might otherwise have been consumed by the service provider communicating with one or more customers regarding disrupted services, investigating a source of the disrupted services, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
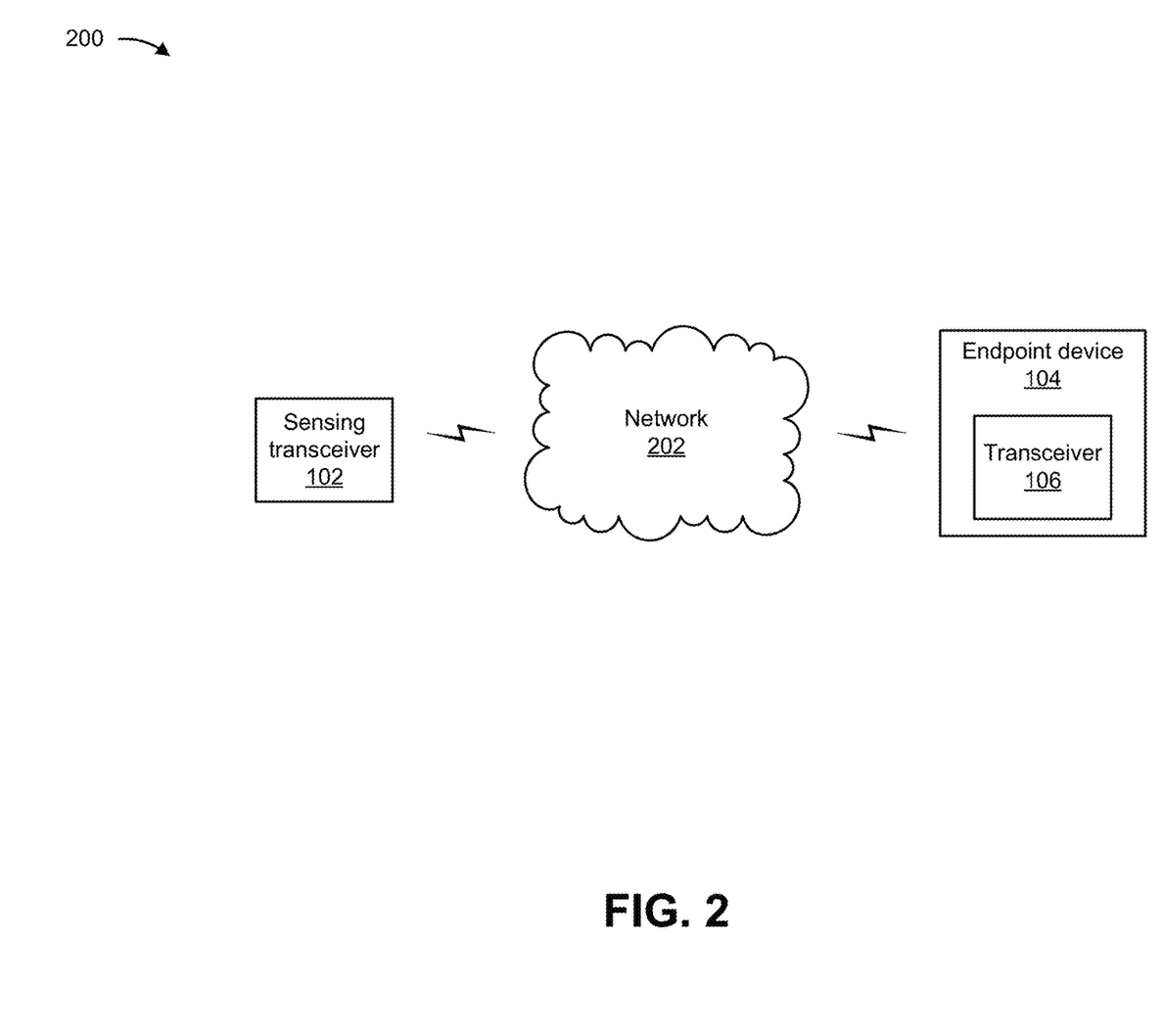
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a sensing transceiver 102, an endpoint device 104, a transceiver 106, and a network 202. Devices of environment 200 may interconnect via wired connections, wireless connections, or a combination of wired and wireless connections.

The sensing transceiver 102 includes one or more devices capable of receiving, generating, processing, and/or providing an optical signal via an optical fiber, as described herein. For example, the sensing transceiver 102 may include an optical transmitter and an optical receiver. The optical transmitter may be configured to transmit an optical signal through at least one optical fiber across the optical network to a designated optical receiver. The optical receiver may be configured to receive an optical signal transmitted by an optical transmitter via at least one optical fiber.

The endpoint device 104 includes one or more devices capable of receiving, generating, processing, and/or providing traffic, as described herein. For example, the endpoint device 104 may include a customer premises equipment, a server device, a desktop computer, a laptop computer, or a similar type of device. In some implementations, the endpoint device 104 may receive information from and/or transmit information to one or more other devices of environment 200.

The transceiver 106 includes one or more devices capable of receiving, generating, processing, and/or providing an optical signal via an optical fiber, as described herein. For example, the transceiver 106 may include an optical transmitter and an optical receiver. The optical transmitter may be configured to transmit an optical signal through at least one optical fiber across the optical network to a designated optical receiver. The optical receiver may be configured to receive an optical signal transmitted by an optical transmitter via at least one optical fiber. In some implementations, the transceiver 106 is included in the endpoint device 104. In some implementations, the transceiver 106 is separate from the endpoint device 104.

The network 202 includes one or more optical networks capable of communicating an optical signal, as described herein. The network 202 may include one or more fiber optic cables. For example, the network 202 may include a backbone fiber optic cable, an access fiber optic cable, and/or the like. Each fiber optic cable may include an array of optical fibers capable of communicating an optical signal. The network 202 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
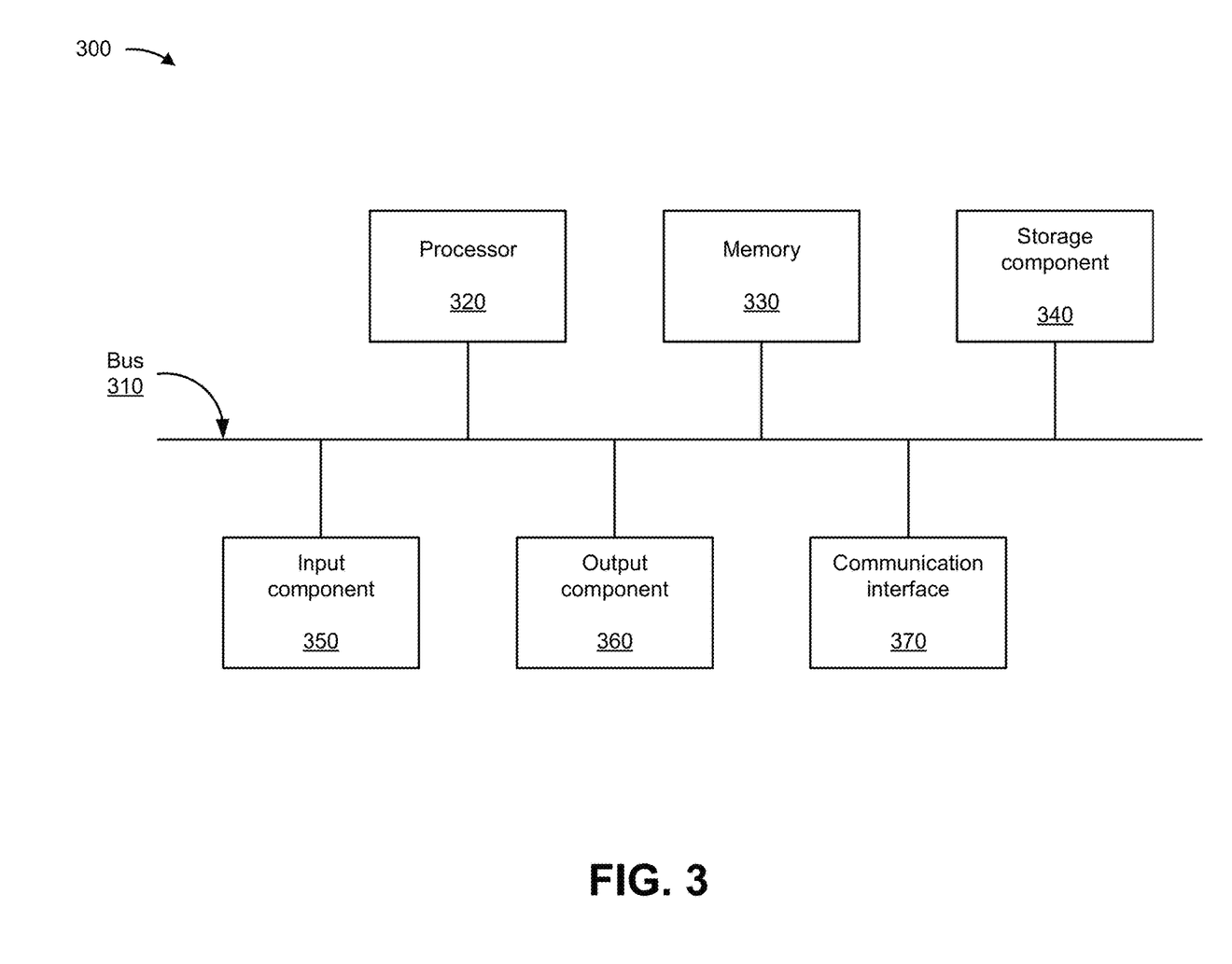
FIG. 3 is a diagram of example components of one or more devices of FIG. 2.

FIG. 3 is a diagram of example components of a device 300, which may correspond to the sensing transceiver 102, the endpoint device 104, and/or the transceiver 106. In some implementations, the sensing transceiver 102, the endpoint device 104, and/or the transceiver 106 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
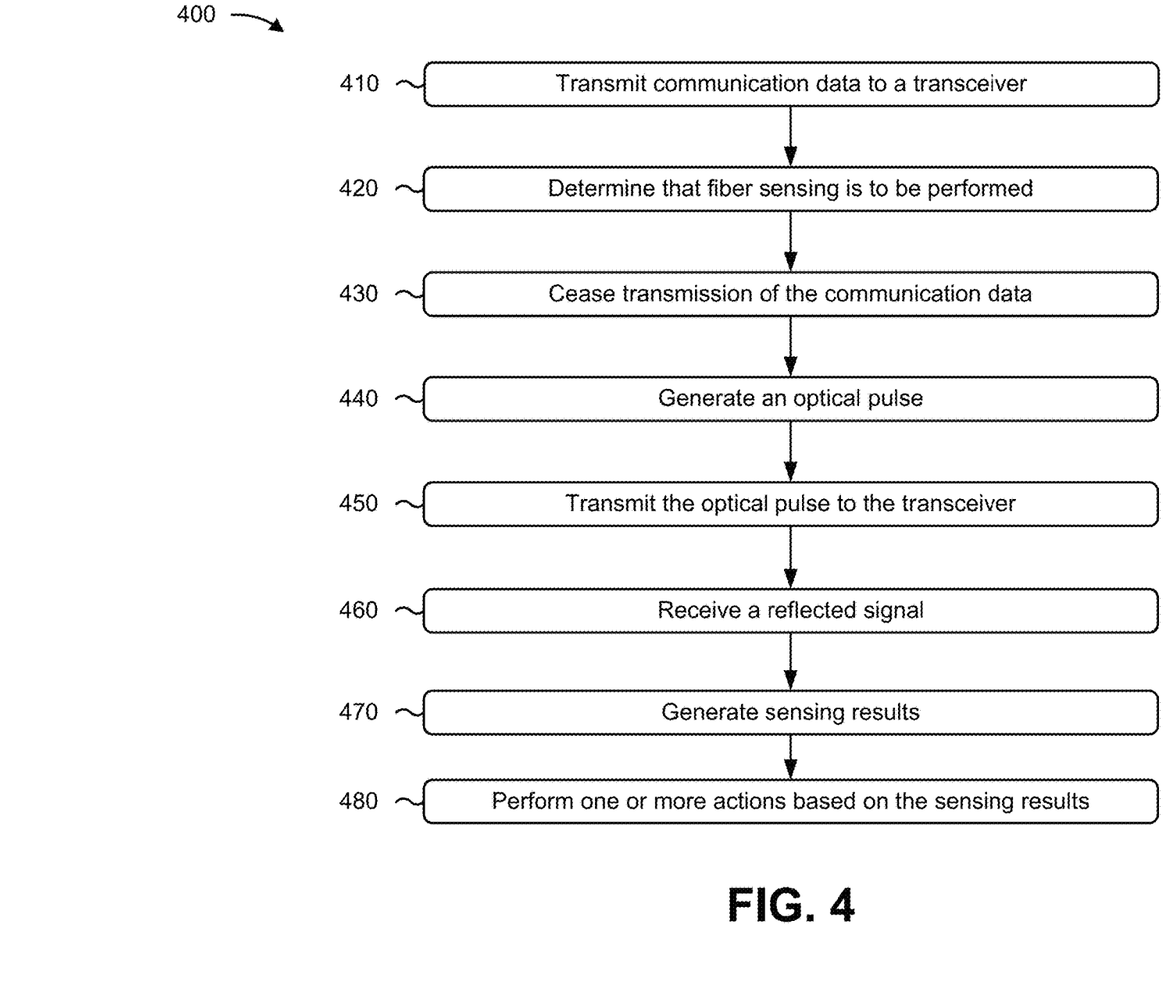
FIG. 4 is a flowchart of an example process relating to sensing fiber optic cables of access networks.

FIG. 4 is a flowchart of an example process 400 associated with sensing fiber optic cables of access networks. In some implementations, one or more process blocks of FIG. 4 may be performed by a device (e.g., the sensing transceiver 102). In some implementations, one or more process blocks of FIG. 4 may be performed by another device or a group of devices separate from or including the device, such as a transceiver (e.g., the transceiver 106) and/or an endpoint device (e.g., the endpoint device 104). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include transmitting communication data to a transceiver (block 410). For example, the device may transmit communication data to a transceiver via an access fiber optic cable, as described above. In some implementations, the access fiber optic cable may connect to a backbone fiber optic cable. The backbone fiber optic cable may be connected to the device. The access fiber cable may connect directly to the transceiver or to a splitter that directly connects to the transceiver. For example, a first end of the access fiber optic cable may connect to the backbone fiber optic cable that is connected to the device, and a second end of the access fiber optic cable may connect directly to the transceiver or to a splitter that directly connects to the transceiver. In some implementations, the transceiver is provided within an endpoint device connected to the access fiber optic cable.

As further shown in FIG. 4, process 400 may include determining that fiber sensing is to be performed (block 420). For example, the device may determine that fiber sensing is to be performed for the access fiber optic cable, as described above.

As further shown in FIG. 4, process 400 may include ceasing transmission of the communication data (block 430). For example, the device may cease transmission of the communication data for a predetermined time period, as described above. The predetermined time period may be associated with ceasing data transmission and may be set by an asynchronous transmission protocol.

As further shown in FIG. 4, process 400 may include generating an optical pulse (block 440). For example, the device may generate an optical pulse based on ceasing transmission of the communication data, as described above. The device may generate the optical pulse, with a light source, an optical amplifier, a modulator, and an optical circulator of the device, after ceasing transmission of the communication data.

As further shown in FIG. 4, process 400 may include transmitting the optical pulse to the transceiver (block 450). For example, the device may transmit the optical pulse to the transceiver via the access fiber optic cable, as described above. In some implementations, the device may transmit the optical pulse to the transceiver via an optical circulator of the device.

As further shown in FIG. 4, process 400 may include receiving a reflected signal (block 460). For example, the device may receive, prior to expiration of the predetermined time period, a reflected signal from the access fiber optic cable based on the optical pulse, as described above. A photodetector of the device may receive the reflected signal from the access fiber optic cable based on the optical pulse.

As further shown in FIG. 4, process 400 may include generating sensing results (block 470). For example, the device may analyze the reflected signal to generate sensing results, as described above. The device may determine properties associated with the reflected signal and may analyze the properties associated with the reflected signal. The device may generate the sensing results based on analyzing the properties associated with the reflected signal.

As further shown in FIG. 4, process 400 may include performing one or more actions based on the sensing results (block 480). For example, the device may perform one or more actions based on the sensing results, as described above.

In some implementations, the device may determine that transmission of the communication data is to be resumed after expiration of the predetermined time period. The device may transmit the communication data to the transceiver, via the access fiber optic cable, based on determining that transmission of the communication data is to be resumed after expiration of the predetermined time period.

In some implementations, the device may provide the sensing results to another device for storage and further processing. Alternatively, and/or additionally, the device may determine, based on the sensing results, whether the access fiber optic cable is operational, whether the access fiber optic cable is damaged, whether the access fiber optic cable is destroyed, and/or whether the access fiber optic cable is experiencing vibrations.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   transmitting, by a device, communication data to a transceiver via an access fiber optic cable, wherein the access fiber optic cable is a fiber optic cable connecting the transceiver to a backbone fiber optic cable, the backbone fiber optic cable being a fiber optic cable provided between two or more locations;
   determining, by the device, that fiber sensing is to be performed for the access fiber optic cable;
   ceasing, by the device, transmission of the communication data for a predetermined time period that is less than a period of time for which an asynchronous transmission protocol allows a data flow to be interrupted without triggering determination of an alternate route for the data flow;
   generating, by the device, an optical pulse based on ceasing transmission of the communication data;
   transmitting, by the device, the optical pulse to the transceiver via the access fiber optic cable;
   receiving, by the device and prior to expiration of the predetermined time period, a reflected signal from the access fiber optic cable based on the optical pulse;
   analyzing, by the device, the reflected signal to generate sensing results; and
   performing, by the device, one or more actions based on the sensing results.

2. The method of claim 1, wherein the transceiver is provided within an endpoint device connected to the access fiber optic cable.

3. The method of claim 1, wherein analyzing the reflected signal to generate the sensing results comprises:
   determining properties associated with the reflected signal;
   analyzing the properties associated with the reflected signal; and
   generating the sensing results based on analyzing the properties associated with the reflected signal.

4. The method of claim 1, further comprising:
   determining that transmission of the communication data is to be resumed after expiration of the predetermined time period; and
   transmitting the communication data to the transceiver, via the access fiber optic cable, based on determining that transmission of the communication data is to be resumed after expiration of the predetermined time period.

5. The method of claim 1, wherein the backbone fiber optic cable is connected to the device.

6. The method of claim 1, wherein the access fiber optic cable connects directly to the transceiver or to a splitter that directly connects to the transceiver.

7. The method of claim 1, wherein generating the optical pulse after ceasing transmission of the communication data comprises:
   generating the optical pulse, with a light source, an optical amplifier, a modulator, and an optical circulator of the device, after ceasing transmission of the communication data.

8. A device, comprising:
   one or more processors configured to:
     transmit communication data to a transceiver via an access fiber optic cable, wherein the access fiber optic cable is a fiber optic cable connecting the transceiver to a backbone fiber optic cable, the backbone fiber optic cable being a fiber optic cable provided between two or more locations;
     determine that fiber sensing is to be performed for the access fiber optic cable;
     cease transmission of the communication data for a predetermined time period that is less than a period of time for which an asynchronous transmission protocol allows a data flow to be interrupted without triggering determination of an alternate route for the data flow;
     generate an optical pulse after ceasing transmission of the communication data;
     transmit the optical pulse to the transceiver via the access fiber optic cable;
     receive a reflected signal from the access fiber optic cable based on the optical pulse;
     determine properties associated with the reflected signal;
     analyze the properties associated with the reflected signal to generate sensing results; and
     perform one or more actions based on the sensing results.

9. The device of claim 8, wherein the one or more processors, to transmit the optical pulse to the transceiver, are configured to:
   transmit the optical pulse to the transceiver via an optical circulator of the device.

10. The device of claim 8, wherein the one or more processors, to receive the reflected signal from the access fiber optic cable based on the optical pulse, are configured to:
    receive, by a photodetector of the device, the reflected signal from the access fiber optic cable based on the optical pulse.

11. The device of claim 8, wherein the predetermined time period is set by the asynchronous transmission protocol.

12. The device of claim 8, wherein the one or more processors, to perform the one or more actions, are configured to one or more of:
    provide the sensing results to another device for storage and further processing;
    determine, based on the sensing results, whether the access fiber optic cable is operational; or
    determine, based on the sensing results, whether the access fiber optic cable is damaged.

13. The device of claim 8, wherein the one or more processors, to perform the one or more actions, are configured to one or more of:
    determine, based on the sensing results, whether the access fiber optic cable is destroyed; or determine, based on the sensing results, whether the access fiber optic cable is experiencing vibrations.

14. The device of claim 8, wherein receiving the reflected signal from the access fiber optic cable occurs prior to expiration of the predetermined time period.

15. A non-transitory computer-readable medium storing a set of instructions, the set of instructions comprising:
one or more instructions that, when executed by one or more processors of a device, cause the device to:
transmit communication data to a transceiver via an access fiber optic cable, wherein the access fiber optic cable is a fiber optic cable connecting the transceiver to a backbone fiber optic cable, the backbone fiber optic cable being a fiber optic cable provided between two or more locations;
determine that fiber sensing is to be performed for the access fiber optic cable;
cease transmission of the communication data for a predetermined time period that is less than a period of time for which an asynchronous transmission protocol allows a data flow to be interrupted without triggering a determination of an alternate route for the data flow;
generate an optical pulse after ceasing transmission of the communication data;
transmit the optical pulse to the transceiver via the access fiber optic cable;
receive a reflected signal from the access fiber optic cable based on the optical pulse prior to expiration of the predetermined time period;
analyze the reflected signal to generate sensing results;
perform one or more actions based on the sensing results;
determine that transmission of the communication data is to be resumed after expiration of the predetermined time period; and
transmit the communication data to the transceiver, via the access fiber optic cable, based on determining that transmission of the communication data is to be resumed after expiration of the predetermined time period.

16. The non-transitory computer-readable medium of claim 15, wherein the one or more instructions, that cause the device to analyze the reflected signal to generate the sensing results, cause the device to:
determine properties associated with the reflected signal; and
analyze the properties associated with the reflected signal to generate the sensing results.

17. The non-transitory computer-readable medium of claim 15, wherein a first end of the access fiber optic cable connects to the backbone fiber optic cable that is connected to the device, and
wherein a second end of the access fiber optic cable connects directly to the transceiver or to a splitter that directly connects to the transceiver.

18. The non-transitory computer-readable medium of claim 15, wherein the one or more instructions, that cause the device to generate the optical pulse after ceasing transmission of the communication data, cause the device to:
generate the optical pulse, with a light source, an optical amplifier, a modulator, and an optical circulator of the device, after ceasing transmission of the communication data.

19. The non-transitory computer-readable medium of claim 15, wherein the one or more instructions, that cause the device to transmit the optical pulse to the transceiver, cause the device to:
transmit the optical pulse to the transceiver via an optical circulator of the device.

20. The non-transitory computer-readable medium of claim 15, wherein the one or more instructions, that cause the device to perform the one or more actions, cause the device to one or more of:
provide the sensing results to another device for storage and further processing;
determine, based on the sensing results, whether the access fiber optic cable is operational;
determine, based on the sensing results, whether the access fiber optic cable is damaged;
determine, based on the sensing results, whether the access fiber optic cable is destroyed; or
determine, based on the sensing results, whether the access fiber optic cable is experiencing vibrations.

* * * * *